Aug. 18, 1964
J. C. BERGMANN
3,144,796
MULTIPLE CIRCULAR SHEAR
Original Filed Sept. 5, 1958
2 Sheets-Sheet 2
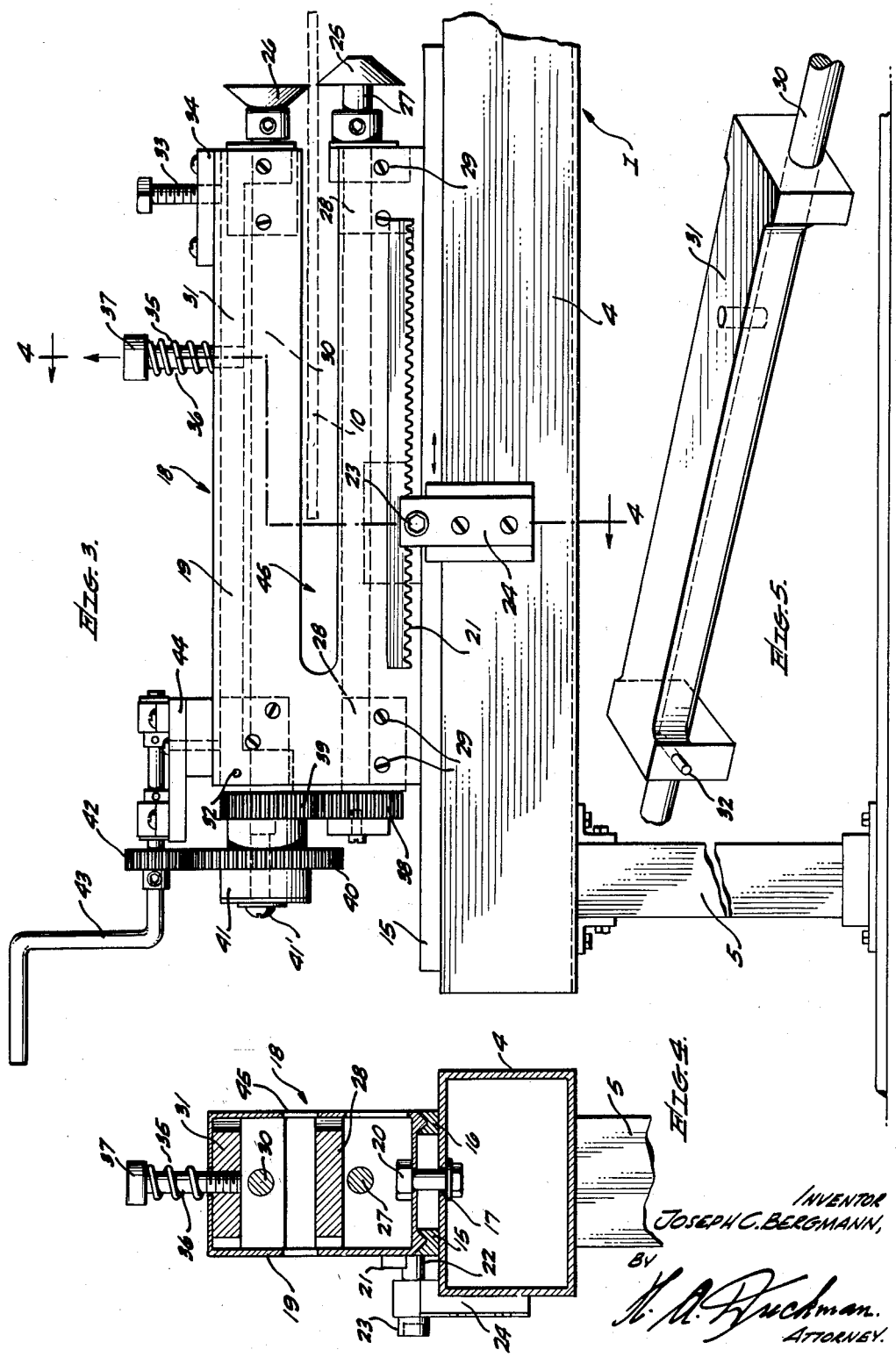
INVENTOR
JOSEPH C. BERGMANN,
BY
*H. A. Buchman.*
ATTORNEY.

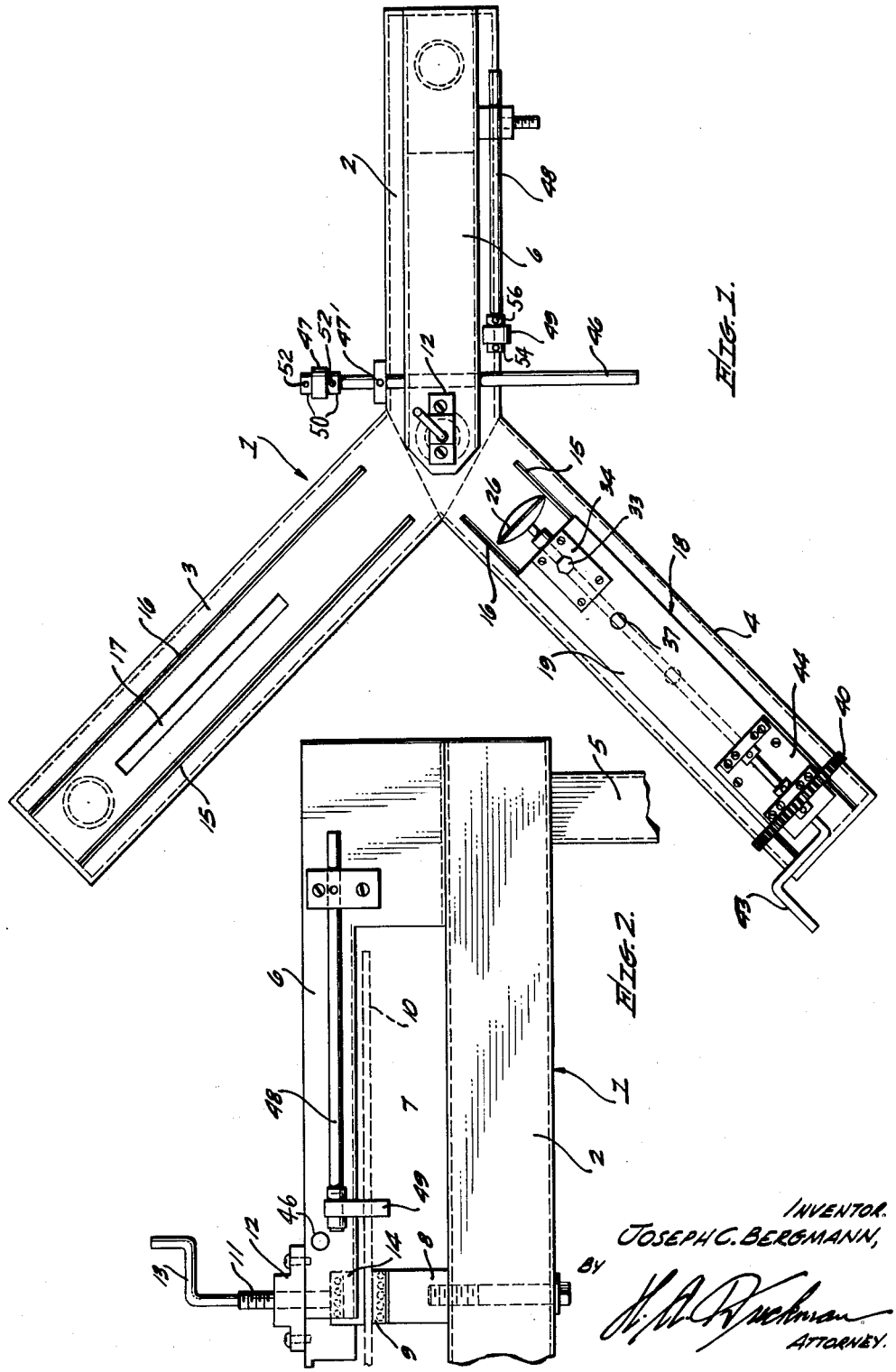

United States Patent Office 3,144,796
Patented Aug. 18, 1964

3,144,796
MULTIPLE CIRCULAR SHEAR
Joseph C. Bergmann, 5138 E. Imperial Highway,
Lynwood, Calif.
Continuation of application Ser. No. 759,301, Sept. 5, 1958. This application Mar. 19, 1962, Ser. No. 182,995
6 Claims. (Cl. 82—57)

This invention relates to a multiple circular shear, whereby a disc or a ring of metal may be cut from a single unit; my multiple circular shear consisting of two or more shears or cutters which will cut different diameters from a single sheet of metal and with one setting of the cutters.

This application is a continuation of my application for "Multiple Circular Shear," Serial No. 759,301, filed September 5, 1958, now abandoned.

Another object of my invention is to provide a novel multiple circular shear in which there are two separate cutting units, one unit cutting the outside diameter and the other cutting a smaller or inside diameter; these two diameters being cut with one setting of the machine and continued rings or discs may be cut from successive sheets of metal without resetting the machine.

Another object of my invention is to provide a novel multiple circular shear in which the cutting heads which carry the shears or metal cutters are slidably mounted on ways, the ways being arranged at an acute angle to the center or hold-down portion of the machine.

Another object of my invention is to provide a plurality of cutting heads and a hold-down arm, the cutting heads and the arm being each provided with horizontal openings or slots therein to receive the sheet stock and to permit the sheet stock to clear the cutting heads and the hold-down arm so that the sheet stock can be rotated while the disc or ring is cut therefrom.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a plan view of my sheet metal cutter with one of the cutter heads removed from its ways;

FIG. 2 is a fragmentary side elevation of the hold-down portion of my machine;

FIG. 3 is a fragmentary side elevation of one of the cutter heads;

FIG. 4 is a sectional view taken on line 4—4 of FIG. 3;

FIG. 5 is a perspective view of one of the shaft bearings for the cutters.

Referring more particularly to the drawings, my sheet metal cutter includes a stationary bed portion 1, which includes an arm 2 which will be termed the hold-down arm, and a pair of angularly spaced arms 3 and 4 which are preferably arranged at an angle of about 45°, more or less, to the center line of the arm 2. The bed 1 is supported on a plurality of legs 5 which support the bed at a suitable height above the floor. The arms 2, 3 and 4 are preferable formed of structural shapes and are sufficiently rigid to support the superimposed structure. A yoke 6 is fixedly mounted on the arm 2 at one end thereof and this yoke extends parallel to the arm 2 and is spaced above said arm to provide a groove or slot 7 into which the metal sheet can extend when it is held in the cutter.

The metal sheet is gripped at its center between the yoke 6 and the arm 2 in the following manner: A post 8 extends upwardly from the arm 2 and this post is formed with a ball bearing head 9 at its upper end which engages the bottom of the sheet metal plate 10. A screw 11 is threaded through a fitting 12 on the top of the yoke 6, and a crank 13 on the screw enables it to be manually rotated for the purpose of pressing the ball bearing head 14 on the bottom of the screw 11 against the metal sheet 10. Thus the metal sheet is clamped between the heads 9 and 14 and can be freely rotated with the center of these heads arranged at the center of the sheet 10. The sheet 10 is held in this position as it is being cut to form either a disc or a ring as might be required.

The cutter structure for the metal sheet 10 is as follows: Each of the arms 3 and 4 which extend angularly from the hold-down arm 2 is provided with longitudinally extending rails 15-16. These rails extend substantially the entire length of each of the arms 3 and 4 and the purpose of these rails will be subsequently described. Each arm is also provided with a longitudinal slot 17 and the purpose of this slot will also be subsequently described. A cutter head 18 is slidably mounted on the rails 15-16 and since the heads 18 are identical in construction and method of mounting on the respective arms 3 and 4, only one such head will be described in detail.

The cutting head 18 includes an elongated box-like frame 19 which is open at both ends but includes side walls, a top and a bottom substantially as shown. A bolt 20 extends through the bottom of the frame 19 and through the slot 17 so that the head 18 can be clamped in its required adjusted position on the arms 3 or 4, the position depending on the diameter of the cut which is to be made in the metal sheet 10. To assist the operator in accurately adjusting the head 18 longitudinally along the arms 3 or 4, there is also provided a rack 21 on the side of the frame 19, and this rack is engaged by a gear 22 which is mounted on the shaft 23 journaled in a plate 24 which is secured to the side of the arm 3 or 4; thus rotation of the shaft 23 by means of a crank or the like will move the frame 19 lengthwise of the arms 3 or 4, thus adjusting the cutter head 18 as necessary. The rails 15-16 will hold the cutter heads 18 in accurate alignment on the arms 3 and 4 and also these rails permit the cutter heads to be moved longitudinally as necessary.

The rotary cutters or shears 25 and 26 which actually engage and cut the metal sheet 10 are mounted as follows:

The cutter 25 is attached to the inner end of a shaft 27. This shaft is journaled in bearing blocks 28 which are fixedly attached to the frame 19 and on the inside thereof by means of suitable cap screws, bolts or the like 29. The upper cutter 26 is fixedly attached to the inner end of a shaft 30 which is journaled in a bearing strip 31. This bearing strip has a relatively small vertical movement at its inner end to permit the cutter 26 to be moved downwardly towards the cutter 25 for the purpose of eventually severing the metal sheet 10. For this reason the bearing strip 31 is pivotally mounted at one end on the pin 32 which extends into the side walls of the frame 19. An adjusting bolt 33 is threaded through a boss 34 on the top of the frame 19 and engages the bearing strip 31. Thus as the bolt 33 is screwed downwardly the bearing strip 31 will pivot around the pin 32, permitting the cutter 26 to move towards the cutter 25. As previously stated, the movement of the bearing strip 31 at its inner end is relatively slight because the metal sheet 10 is quite thin and, therefore, a great deal of adjustment is unnecessary.

The bearing strip 31 is urged upwardly to separate the cutters 25–26 by means of a spring 35 which surrounds the bolt 36 threaded into the bearing strip 31. The spring 35 bears against the head 37 of the bolt 36 and also against the top of the frame 19, thus urging the bearing strip 31 upwardly when the adjusting bolt 33 is loosened by the workman. A spur gear 38 is fixedly secured to the forward end of the shaft 27, and this gear meshes with a second spur gear 39 which is secured to the forward end of the shaft 30. The teeth of the gears 38–39 are loosely fitted so that the slight movement of the inner end of the shaft 30 will not disengage these gears. A driving gear 40 is secured to the hub 41 of the gear 39 and this driving gear is rotated by the spur gear 42 on the crank 43. The crank 43 is journaled in the block 44 mounted on top of the frame 19. Thus rotation of the crank 43 will rotate both of the shafts 30 and 27 and the cutters 25–26 for the purpose of cutting the disc or ring from the metal sheet 10. It is obvious that instead of the manual crank 43 a suitable power drive (not shown) may be substituted if it is found desirable. Horizontal slots 45 are provided in the side walls of the frame 19 and these slots are open at the inner end of the frame so that the metal plate 10 can enter the slots during the cutting operation. The hub 41 is held in position on the end of the shaft 30 by means of the bolt 41'. The hub 41 is splined to the end of the shaft 30 so that it can slide longitudinally on the shaft if the bolt 41' is loosened.

A gauge rod 46 is slidably mounted in the yoke 6 and can be adjusted at right-angles to the center line of the yoke for the purpose of centering the square metal sheet 10 about the center of the crank 13. A finger 47 is journaled on the rod 46 and frictionally engaged between a pair of positioning collars 50 secured to one end of the rod by set screws 52 and serves the purpose of engaging or hooking over one side of the sheet 10 so as to properly position that sheet. The gauge rod 46 is held in its adjusted position by the set screw 47' after the square sheet has been once placed in the machine. A second positioning rod 48 is also slidably mounted on the yoke 6, and this positioning rod is also provided with a finger 49 journaled on one end thereof and frictionally engaged by positioning collars 54 secured to rod 48 by set screws 56 which will engage another side of the square metal sheet 10, thus holding the sheet in accurate centralizing position between the fingers 49 and 47. Each subsequent square sheet can thus be inserted in the machine and accurately centered and clamped by the crank 13, as previously described.

The metal sheet 10 is first clamped between the rotary heads 9 and 14 by turning the screw 11 downwardly against the metal sheet 10, which sheet has been placed horizontally within the groove 7 and between the yoke 6 and the arm 2. The metal sheet 10 also projects into the grooves 45 of the heads 18 and extends between the cutters 25–26. The metal sheet 10 is centered by means of the fingers 47 and 49 which have been previously properly adjusted to engage two edges of the sheet and thus center the sheet 10 under the rotary heads 9 and 14. The crank 13 is now rotated to clamp the sheet 10 between the heads 9 and 14, after which the fingers 47, 49 are rotated about the axes of rods 46 and 48 respectively, to an out of the way position where they are held by the frictional engagement of collars 50 and 52. The cutter heads 18 are now adjusted by loosening the bolt 20 and rotating the gear 22 on the shaft 23. After the cutting heads 18 have been adjusted they are held in adjusted position by tightening the screw 20. The operator now tightens the screw 33 to force the cutter 26 against the metal plate 10 and then rotates the crank 43 which, in turn, rotates both of the cutters 26 and 25. Rotation of these cutters will also rotate the sheet 10 as it is cut and the operator will continue to tighten the bolt 33 from time to time as required until the metal plate 10 is severed. This is done for both cutter heads if a ring is being cut, or for a single cutter head if a disc is being cut.

I claim:
1. In sheet metal cutting apparatus: stationary support means; means for clamping sheet metal to said support means for rotation about a fixed axis through at least 360 degrees; a plurality of cutter support members angularly spaced from one another and mounted on said stationary support means for movement to and from said axis in separate planes generally radial of said axis; a pair of oppositely driven, rotary cutters disposed one above the other for severing the sheet metal and rotatably carried by each of said support members; means carried by each of said support members for independently rotating each pair of cutters, whereby the pair of cutters on one support member severs the sheet metal and rotates it about the said fixed axis independently of the pair of cutters on another support member; means for individually shifting said cutter support members on said stationary means to and from said axis to locate one pair of cutters a different distance from said axis than another pair of cutters whereby the pairs of cutters are adapted to be independently rotated to cut a ring in the sheet metal; and means for selectively moving the upper cutter of each pair to and from its companion lower cutter to place such pair of cutters in shearing relation or out of shearing relation to the sheet metal therebetween.

2. In sheet metal cutting apparatus: stationary support means; means for clamping sheet metal to said support means for rotation about a fixed axis through at least 360 degrees; a plurality of cutter support members angularly spaced from one another and mounted on said stationary support means for movement to and from said axis in separate vertical planes generally radial of said axis; a pair of vertically spaced, oppositely driven rotary cutters carried by each of said plurality of cutter support members; means for individually shifting said cutter support members on said stationary means to and from said axis to locate the pair of cutters on one of said support members a different distance from said axis than the pair of cutters on another of said support members, whereby the plurality of rotary cutter pairs are adapted to cut a ring in the sheet metal; means for selectively moving the upper cutter of each pair to and from its companion lower cutter to place such pair of cutters in shearing relation or out of shearing relation to the sheet metal therebetween; means for independently actuating each pair of cutters, whereby the pair of cutters on one support member severs the sheet metal and rotates it about the fixed axis independently of the pair of cutters on another support member; said cutter support members having elongate generally horizontal slots into and through which the sheet metal can move during severing of the sheet metal by one of the pairs of rotary cutters.

3. In a sheet metal cutter, a stationary bed structure including a first hold down arm and second and third cutter head supporting arms, all of said arms being angularly spaced, joined at their inner ends, and lying in the same horizontal plane, a yoke member fixedly secured to the outer end of said first arm, said yoke member having an integral portion thereof vertically spaced above said first arm and extending inwardly throughout a major portion of the length of said first arm substantially to the inner end thereof to form a first horizontally disposed sheet metal receiving slot between the first arm and the inwardly extending portion of the yoke, vertically aligned clamping means carried by said first arm and said yoke member at the inner ends thereof for clamping and defining a fixed vertical axis of rotation for a piece of sheet metal received within said slot, the central longitudinal axes of said first, second and third arms intersecting at said fixed vertical axis, a cutter head mounted on each of said second and third arms for controlled reciprocal movement toward and away from said fixed vertical axis, adjustable means interconnecting each of said second and third arms with its respective cutter head for fixedly positioning each cutter head at a desired distance from said axis, a sheet metal receiving slot formed in each of said cutter heads and lying in the same horizontal plane as said first slot, a pair of oppositely driven rotary sheet metal cutters including a vertically adjustable cutter carried by each of said cutting heads for engagement with opposite sides of a piece of sheet metal received within the sheet metal receiving slots, each pair of said cutters being generally vertically aligned with their cutting peripheral edges lying in a plane tangential to a circle whose center lies on the fixed vertical axis whereby when one pair of cutters is rotated a piece of sheet metal held by said clamping means may be continually rotated about said fixed vertical axis to sever the sheet metal, and means carried by each of said cutter heads for independently rotating each pair of cutters.

4. In a sheet metal cutter, three angularly spaced stationary supporting arms joined at their inner ends, means supporting a sheet metal clamp for rotation about a fixed vertical axis at the inner end of one of said arms, said means defining with said one arm a first elongated sheet metal receiving slot, a cutter head mounted for reciprocal movement on each of the other two arms, adjustable means interconnecting each of said arms with its respective cutter head for fixedly positioning each head at a desired radial distance from said axis, each of said cutter heads having a sheet metal receiving slot lying in the same horizontal plane as said first slot, a pair of vertically spaced, oppositely driven rotary cutter means including a vertically adjustable cutter carried by each of said cutter heads for engaging opposite sides of a sheet metal work piece received within the slots to rotate the same about said fixed vertical axis, and means carried by each of said cutter heads for independently driving each pair of cutters whereby a sheet metal work piece engaged by said clamp may be rotated about said fixed axis to make a circular cut.

5. The invention defined in claim 4 wherein the first mentioned means is provided with guide means for positioning a sheet metal work piece within the sheet metal receiving slots.

6. A device for making plural concentric circular cuts in a sheet metal work piece comprising: three angularly spaced stationary supporting arms joined at their inner ends, means supporting a sheet metal clamp for rotation about a fixed vertical axis at the inner end of one of said arms, said means defining with said one arm a first elongated sheet metal receiving slot, a cutter head mounted for controlled reciprocal movement radially of said axis on each of the other two arms, each of said cutter heads having a sheet metal receiving slot lying in the same horizontal plane as said first slot, rotary cutter means including a vertically adjustable cutter carried by each of said heads for rotating and cutting a sheet metal work piece engaged by said clamp, and means carried by each of said cutter heads for driving said rotary cutter means.

References Cited in the file of this patent
UNITED STATES PATENTS

| | | |
|---|---|---|
| 2,532 | Gregg | Apr. 1, 1842 |
| 13,295 | Applebee | July 24, 1855 |
| 45,841 | Low | Jan. 10, 1865 |
| 446,241 | Willis | Feb. 10, 1891 |
| 1,299,688 | De Long | Apr. 8, 1919 |
| 1,783,869 | Allen | Dec. 2, 1930 |
| 2,127,002 | Murphy | Aug. 16, 1938 |
| 2,209,211 | Smith | July 23, 1940 |
| 2,779,414 | Broden | Jan. 29, 1957 |